A. VANNORMAN.
Seed-Dropper.
No. 200,110. Patented Feb. 5, 1878.
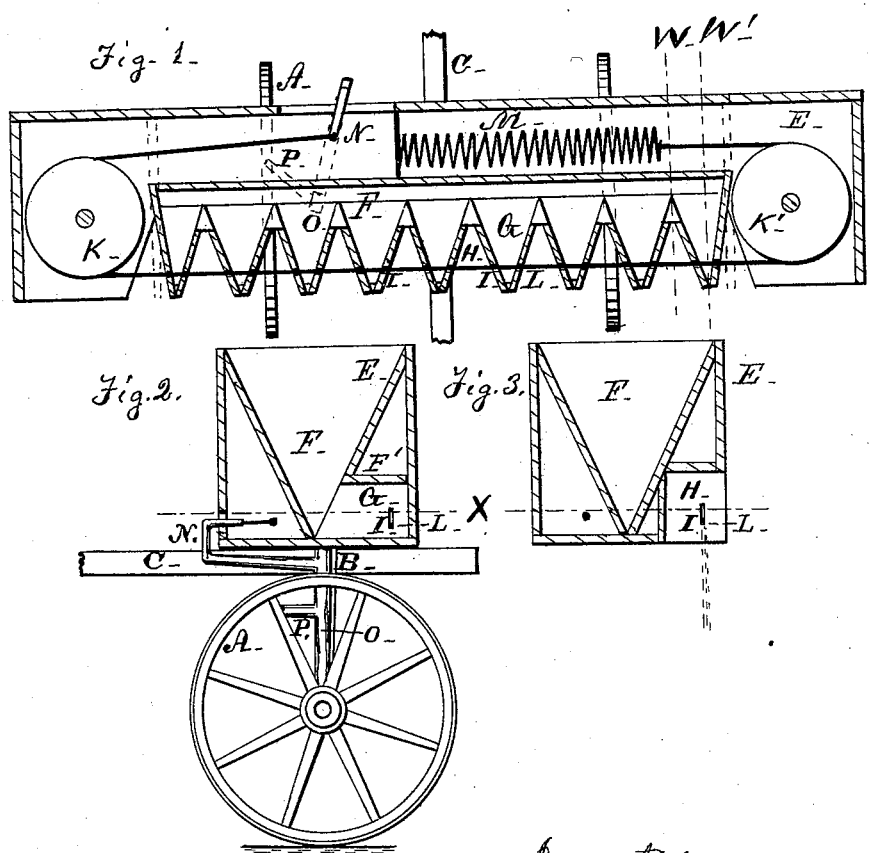

UNITED STATES PATENT OFFICE.

AARON VANNORMAN, OF BENTON TOWNSHIP, KNOX COUNTY, (SAND HILL P. O.,) MISSOURI.

IMPROVEMENT IN SEED-DROPPERS.

Specification forming part of Letters Patent No. 200,110, dated February 5, 1878; application filed November 30, 1877.

*To all whom it may concern:*

Be it known that I, AARON VANNORMAN, of Benton township, Knox county, (Sand Hill P. O.,) Missouri, have invented a new and useful Improvement in Seed-Droppers, of which the following is a specification:

This invention consists in an improved apparatus for dropping seed broadcast, and in arranging for mounting it on the wheel-frame of a corn-cultivator for use.

It is made substantially as set forth hereinafter, referring to the drawings accompanying this, in which—

Figure 1 is a horizontal section on line X, and Figs. 2 and 3 are vertical sections on lines W W' of Fig. 1.

The apparatus is mounted crosswise on the wheel-frame A B C of a corn-cultivator by means of suitable connections, so as to extend over the wheels A on each side. If the bent axle B rises high enough, the box E is mounted directly on it by means of bolts, &c.; and if the axle is not high enough, a suitable block is put between them, and between the box E and the tongue C, with such modifications as may be needed in different cases.

The box E is of suitable length for the width of space desired, and harrows or other means of covering are connected behind the wheels instead of the cultivators.

The box E has inclined walls, to form chamber F for the seed. This has cells G, extending backward under a projecting wall, F', in which the seed can lie loose without being packed too much by the weight, &c. Between the cells are open spaces H, and in the walls between are openings I for the seed to pass out, with slides to adjust them to the seed and to the quantity desired. Through these holes, and through the cells and spaces, passes a cord, L. This passes over pulleys K K' at the ends, and connects with spring M and shaft-arm N. The spring has a fixed connection at one end. The arm N is borne by a rock-shaft, O, which has bearings in the axle B below and box E above. It has a second arm, P, which engages with the spokes of wheel A, so that it moves the shaft and vibrates arm N. The cord is drawn one way by arm N, and back by the spring, so as to work the seed through holes I and drop it broadcast.

Different cords are used, to suit different seeds, as required, formed of textile materials, wire, and chain, plain, with the usual twist creases, and with cells and arms or projections, as suitable.

I claim—

1. The seed-dropper having a lateral series of seed-cells, with a lengthwise back-and-forth vibrating discharger passing through the cells, and their side walls and seed-spaces, with a spring at one end to stir and feed the seed, as set forth.

2. The seed-dropper having a discharger, L, vibrating lengthwise through the seed-cells, with a spring at one end to draw it back, substantially as set forth.

3. The seed-droppers with the elevated seed-box, and wheels underneath and within the extended ends of box, with shaft O, having bar P and operating-crank N, arranged to work the cord or rod dropper L under the overhanging ledge F', substantially as set forth.

AARON VANNORMAN.

Witnesses:
SAML. J. WALLACE,
WM. J. COCHRAN.